US012659252B2

(12) United States Patent
Machireddy et al.

(10) Patent No.: US 12,659,252 B2
(45) Date of Patent: Jun. 16, 2026

(54) SYSTEM AND METHOD FOR DELAY MEASUREMENT IN FRONTHAUL NETWORK USING HARDWARE TIMESTAMPING

(71) Applicant: Rakuten Symphony, Inc., Tokyo (JP)

(72) Inventors: Ramana Reddy Machireddy, Bangalore (IN); Raghunath Hariharan, Tewksbury, MA (US); Ronak Bharatkumar Lalwala, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 302 days.

(21) Appl. No.: 18/275,467

(22) PCT Filed: Nov. 21, 2022

(86) PCT No.: PCT/US2022/050569
§ 371 (c)(1),
(2) Date: Aug. 2, 2023

(87) PCT Pub. No.: WO2024/112319
PCT Pub. Date: May 30, 2024

(65) Prior Publication Data
US 2025/0007806 A1     Jan. 2, 2025

(51) Int. Cl.
*H04L 43/0852* (2022.01)
*H04L 12/00* (2006.01)
(Continued)

(52) U.S. Cl.
CPC ........ *H04L 43/0858* (2013.01); *H04L 43/106* (2013.01); *H04L 12/00* (2013.01);
(Continued)

(58) Field of Classification Search
CPC ... H04L 43/0858; H04L 43/106; H04L 12/00; H04L 28/02; H04L 67/10; H04W 88/085;
(Continued)

(56) References Cited

U.S. PATENT DOCUMENTS

| | | | | |
|---|---|---|---|---|
| 2023/0336261 A1* | 10/2023 | Chen | ...................... | H04B 17/40 |
| 2023/0403692 A1* | 12/2023 | Jeon | .................... | H04W 72/046 |
| 2024/0305533 A1* | 9/2024 | Bai | ........................ | H04W 24/02 |

FOREIGN PATENT DOCUMENTS

| | | |
|---|---|---|
| WO | 2022/187130 A1 | 9/2022 |

OTHER PUBLICATIONS

O-Ran Alliance, "O-RAN Working Group 4 (Open Fronthaul Interfaces WG) Control, User and Synchronization Plane Specification", O-RAN-WG4.CUS.0-v08.00, Technical Specification, 2022, pp. 1-335 (335 pages).

(Continued)

*Primary Examiner* — Tonia L Dollinger
(74) *Attorney, Agent, or Firm* — Sughrue Mion, PLLC

(57) ABSTRACT

An Open Radio Access Network (O-RAN) includes: an O-RAN Radio Unit (O-RU) configured to transmit radio signals to user equipment; an O-RAN Distributed Unit (O-DU) configured to perform baseband processing; and a fronthaul network, wherein the O-RU and the O-DU are nodes of the fronthaul network, and wherein the O-RU and the O-DU are configured to communicate over the fronthaul network; wherein the O-DU is configured to transmit a one-way delay measurement message to the O-RU on the fronthaul network, wherein the one-way delay measurement message includes a value that is based on a hardware time stamp that was inserted immediately prior to transmission of the one-way delay measurement message; and wherein the O-RU is configured to transmit a response to the one-way delay measurement message to the O-DU, wherein the response includes a second value that is based on a second (Continued)

hardware time stamp generated when the O-RU received the one-way delay measurement message from the fronthaul network.

20 Claims, 8 Drawing Sheets

(51) Int. Cl.

| | |
|---|---|
| *H04L 43/106* | (2022.01) |
| *H04L 67/10* | (2022.01) |
| *H04W 4/00* | (2018.01) |
| *H04W 4/02* | (2018.01) |
| *H04W 24/08* | (2009.01) |
| *H04W 28/02* | (2009.01) |
| *H04W 28/04* | (2009.01) |
| *H04W 88/08* | (2009.01) |

(52) U.S. Cl.
CPC .............. *H04L 67/10* (2013.01); *H04W 4/00* (2013.01); *H04W 4/02* (2013.01); *H04W 24/08* (2013.01); *H04W 28/02* (2013.01); *H04W 28/04* (2013.01); *H04W 88/085* (2013.01)

(58) Field of Classification Search
CPC ....... H04W 24/08; H04W 4/02; H04W 28/04; H04W 4/00
See application file for complete search history.

(56) References Cited

OTHER PUBLICATIONS

Ericsson AB et al., "Common Public Radio Interface: eCPRI Interface Specification", eCPRI Specification V2.0, Interface Specification, 2019, pp. 1-109 (109 pages).
Francisco Javier Lorca Hernando et al., "Telefonica views on the design, architecture, and technology of 4G/5G Open RAN networks", Telefonica, 2021, 15 pages.

* cited by examiner

SYSTEM AND METHOD FOR DELAY MEASUREMENT IN FRONTHAUL NETWORK USING HARDWARE TIMESTAMPING

CROSS-REFERENCE TO RELATED APPLICATION

This application is a national stage application of International Application No. PCT/US2022/050569, filed on Nov. 21, 2022, and designated the U.S., the entire contents of which are herein wholly incorporated by reference.

BACKGROUND

1. Field

The disclosure relates to measuring delays in a network. More particularly, the disclosure relates to measuring delays in a front haul network using hardware time stamping.

2. Description of the Related Art

A network may include nodes that are interconnected by a variety of network links. The nodes may transmit various data and messages therebetween. In order to meet certain requirements, the time delay for transmitting the data and messages between the different nodes may need to be maintained within certain thresholds. Accordingly, it can be important to accurately measure the time delay in a network.

It should be noted that the above information of the background is merely provided for clear and complete explanation of the disclosure and for easy understanding for those skilled in the art. No inference should be drawn that any of the above information is known to those skilled in the art.

SUMMARY

Currently, there are no deterministic ways of measuring delay in a fronthaul network. According to certain embodiments, an Open Radio Access Network (O-RAN) comprises: an O-RAN Radio Unit (O-RU) configured to transmit radio signals to user equipment; an O-RAN Distributed Unit (O-DU) configured to perform baseband processing; and a fronthaul network, wherein the O-RU and the O-DU are nodes of the fronthaul network, and wherein the O-RU and the O-DU are configured to communicate over the fronthaul network; wherein the O-DU is configured to transmit a one-way delay measurement message to the O-RU on the fronthaul network, wherein the one-way delay measurement message includes a value that is based on a hardware time stamp that was inserted immediately prior to transmission of the one-way delay measurement message; and wherein the O-RU is configured to transmit a response to the one-way delay measurement message to the O-DU, wherein the response includes a second value that is based on a second hardware time stamp generated when the O-RU received the one-way delay measurement message from the fronthaul network.

According to certain embodiments, a method for one-way delay measurement comprises: generating a one-way delay measurement message comprising a packet at an Open Radio Access Network (O-RAN) Distributed Unit (O-DU); inserting a time stamp in an application layer of the packet; inserting a hardware time stamp in a transport layer of the packet; transmitting the one-way delay measurement message immediately after inserting the hardware time stamp, from the O-DU to an O-RAN Radio Unit (O-RU) over a fronthaul network; inserting a second hardware time stamp in the packet immediately after receiving the one-way delay measurement message by the O-RU; generating a response message to the one-way delay measurement message by the O-RU, wherein the response message comprises a second packet; inserting a second time stamp and a value into the second packet by the O-RU, wherein the value is a difference between the second time stamp and the second hardware time stamp; and transmitting the response message from the O-RU to the O-DU over the fronthaul network.

According to certain embodiments, a communication system comprises: a node, configured to: generate a message comprising a packet; insert a time stamp in an application layer of the packet; insert a hardware time stamp in a transport layer of the packet; and transmit the message immediately after inserting the hardware time stamp, over a network to a second node; and the second node, wherein the second node is configured to: receive the message from the node over the network; insert a second hardware time stamp in the transport layer of the packet, immediately after receiving the message; generate a response, wherein the response comprises a second packet; insert a second time stamp and a value in the second packet, wherein the value is a difference between the second time stamp and the second hardware time stamp; and transmit the response to the node over the network.

BRIEF DESCRIPTION OF THE DRAWINGS

The above and other aspects, features, and advantages of certain embodiments of the disclosure will be more apparent from the following description taken in conjunction with the accompanying drawings, in which.

A brief description of each drawing is provided to better understand the drawings cited herein.

DETAILED DESCRIPTION

Figure 1A:
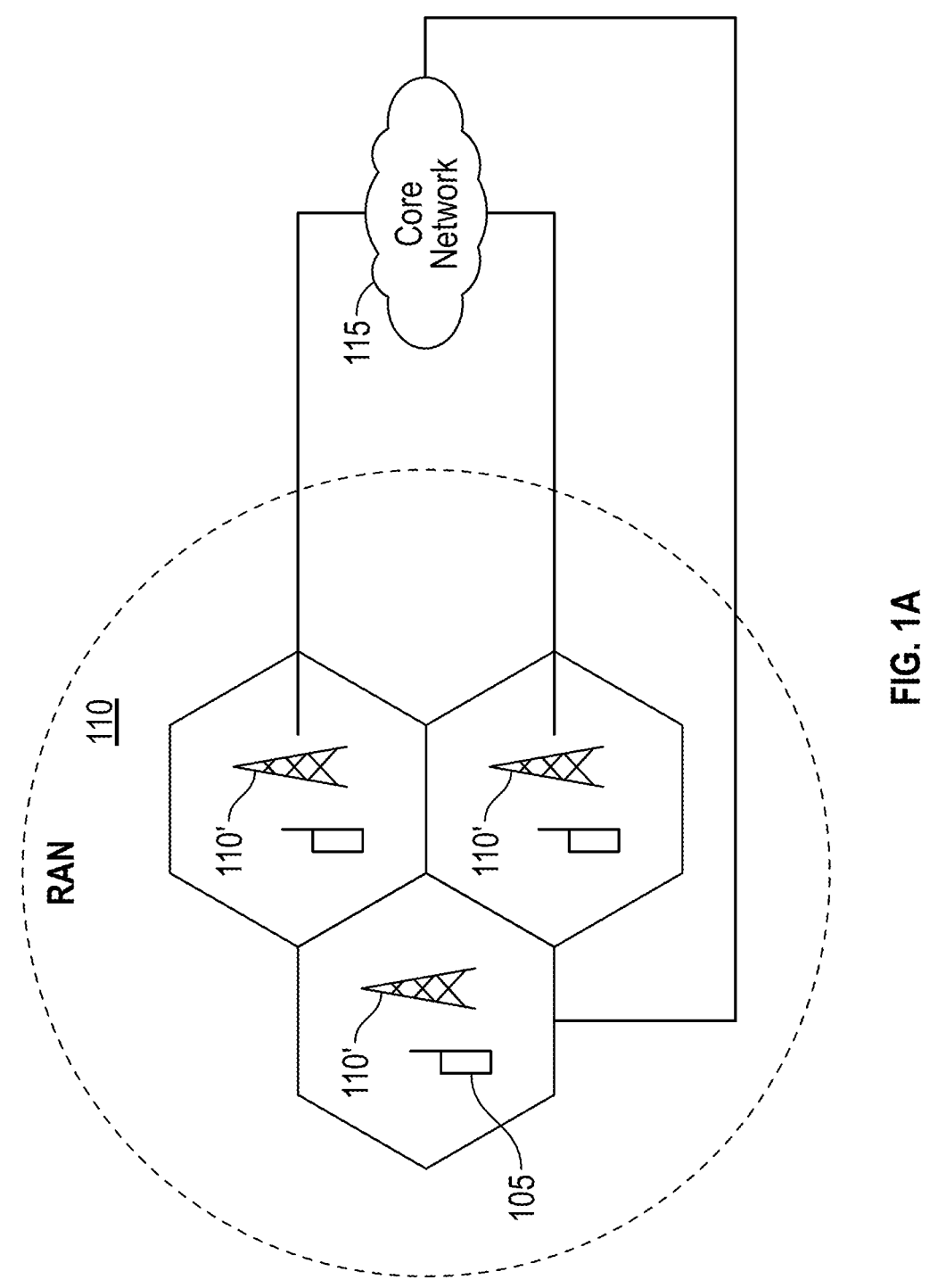
FIG. 1A is a block diagram of a wireless communication system in accordance with certain embodiments of the disclosure.
Figure 1B:
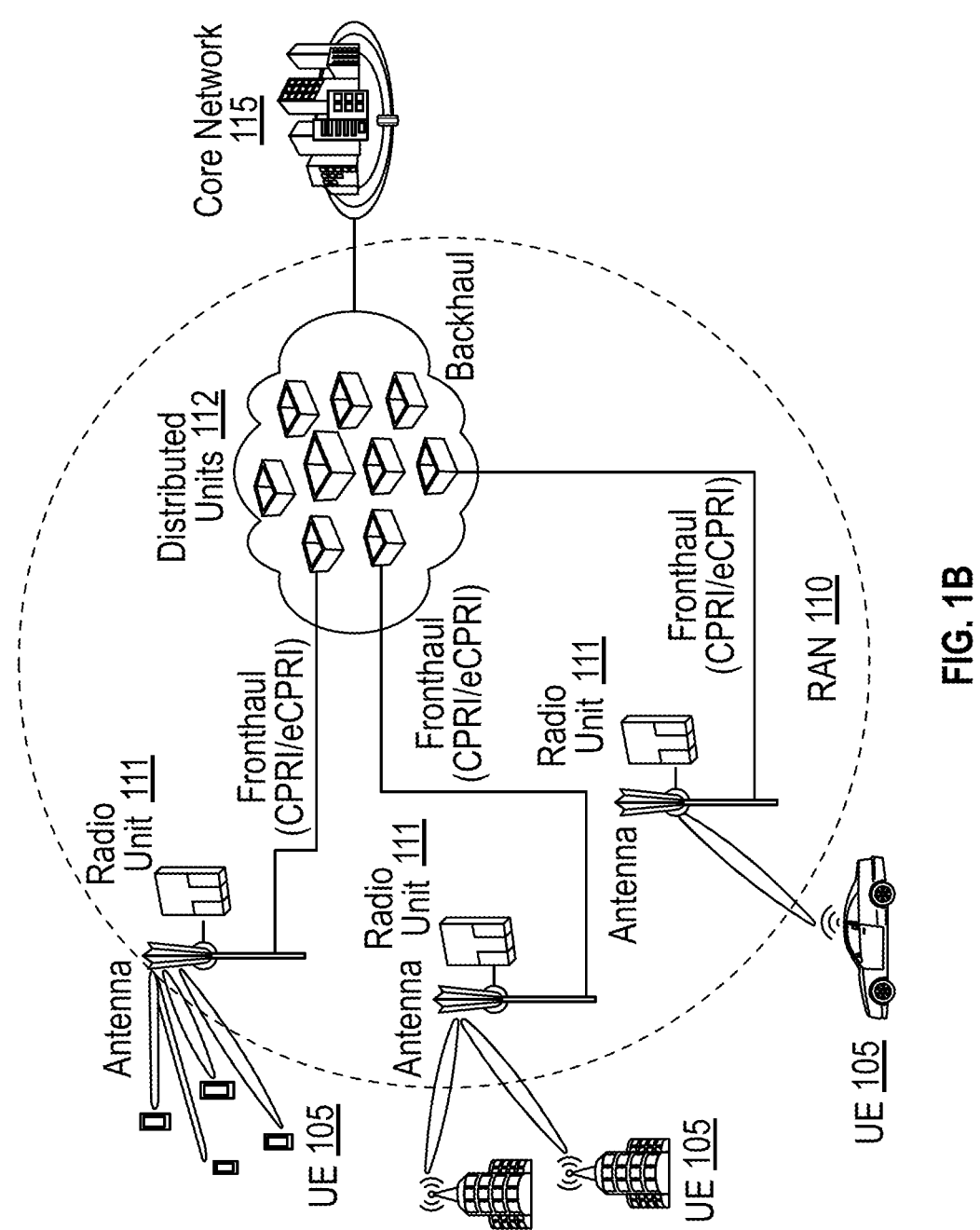
FIG. 1B is a block diagram of a Radio Access Network in accordance with certain embodiments of the disclosure.

The present disclosure provides for determinist delay measurement in the fronthaul network, by using hardware time stamps. The fronthaul network can form a part of a wireless communication system. FIG. 1A discloses a wireless communication system. The fronthaul network can exist between a Radio Access Network (RAN) of base stations that engage in radio communication with user equipment (UE) and a core network. More specifically, as shown in FIG. 1B, the base stations of the RAN include two logical entities-a Radio Unit (RU) such as an Open Radio Access Network (O-RAN) Radio Unit (O-RU), and a Distributed Unit (DU), such as an ORAN Distributed Unit (O-DU). The RU/O-RU is the last node that connects to the UE, while the DU/O-DU connects to the core network. The fronthaul network is between the RU/O-RU and the DU/O-DU as disclosed in both FIG. 1B and FIG. 2.

Figure 3A:
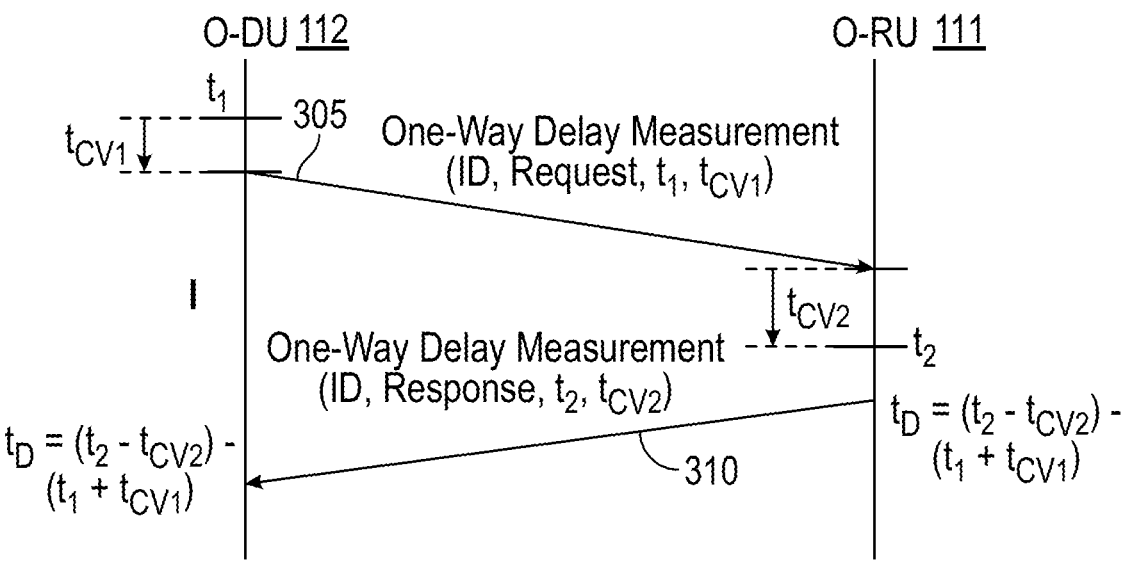
FIG. 3A is a block diagram describing downlink one-way delay measurement in accordance with certain embodiments of the disclosure.
Figure 3B:
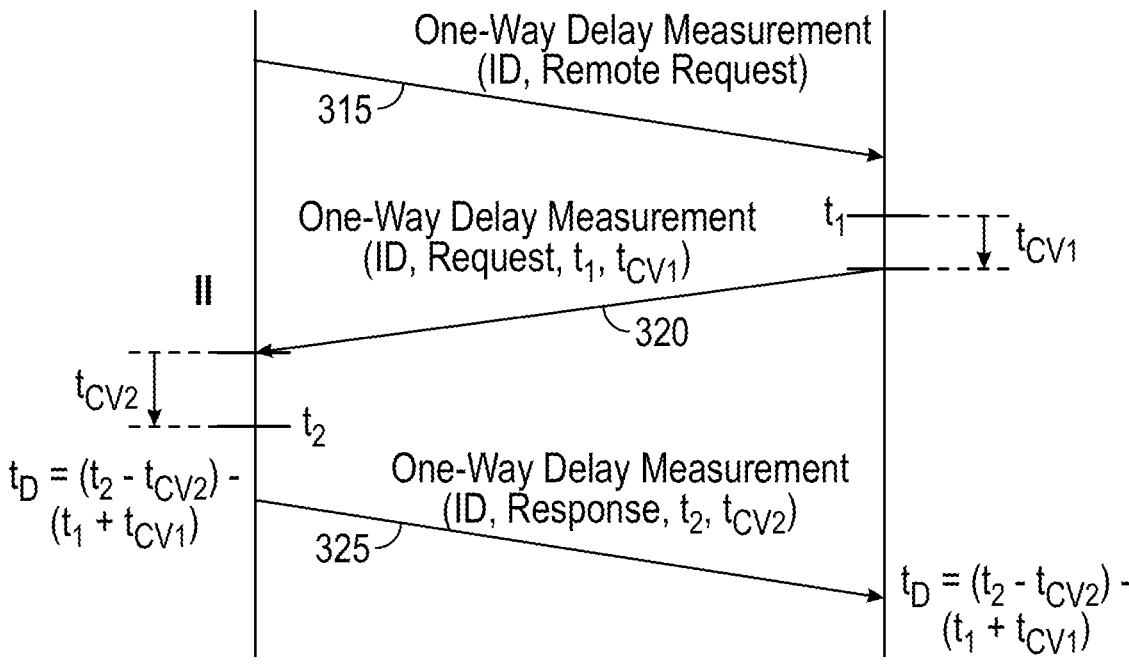
FIG. 3B is a block diagram describing uplink one-way delay measurement in accordance with certain embodiments of the disclosure.
Figure 4:
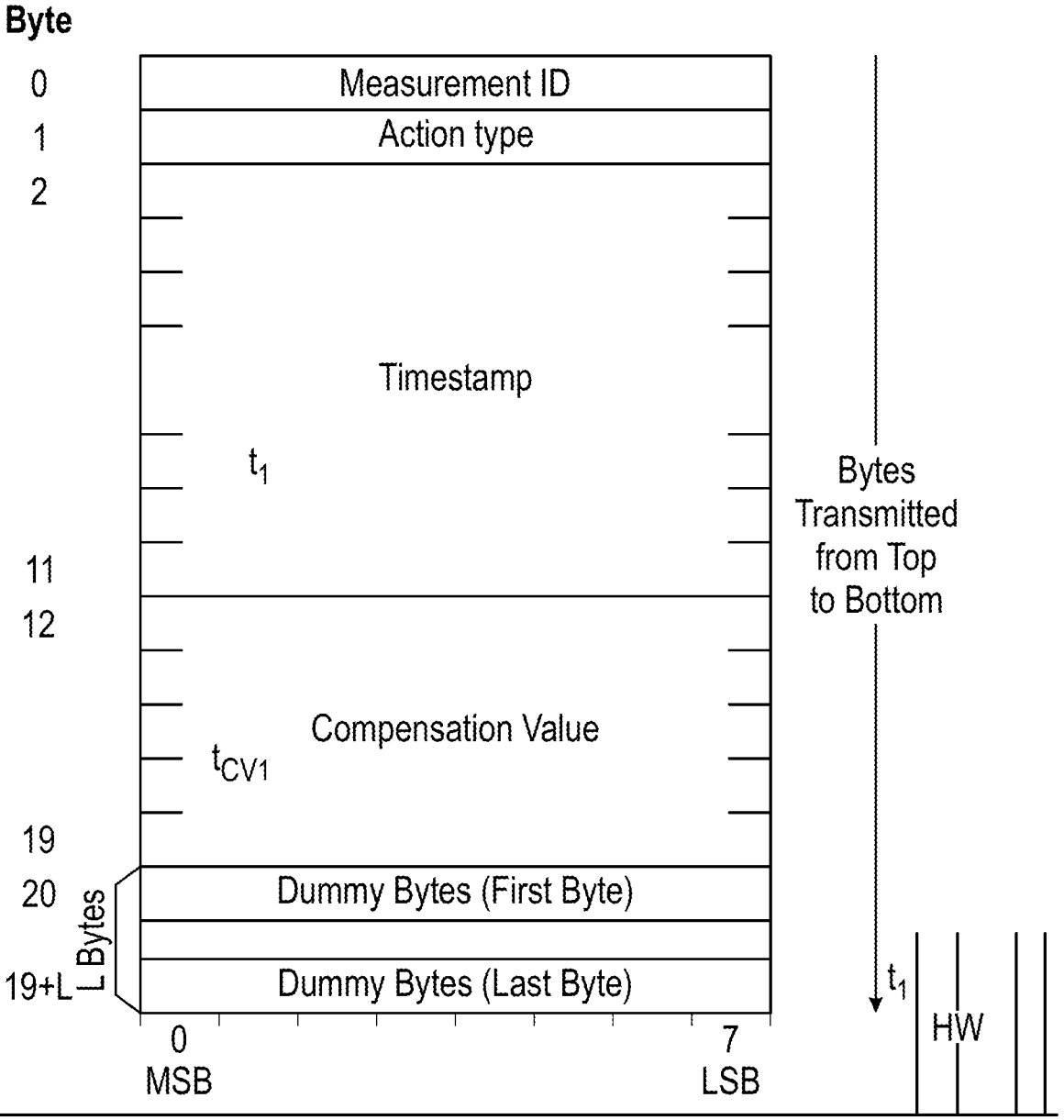
FIG. 4 is a block diagram of a one-way delay measurement message in accordance with certain embodiments of the disclosure.
Figure 5:
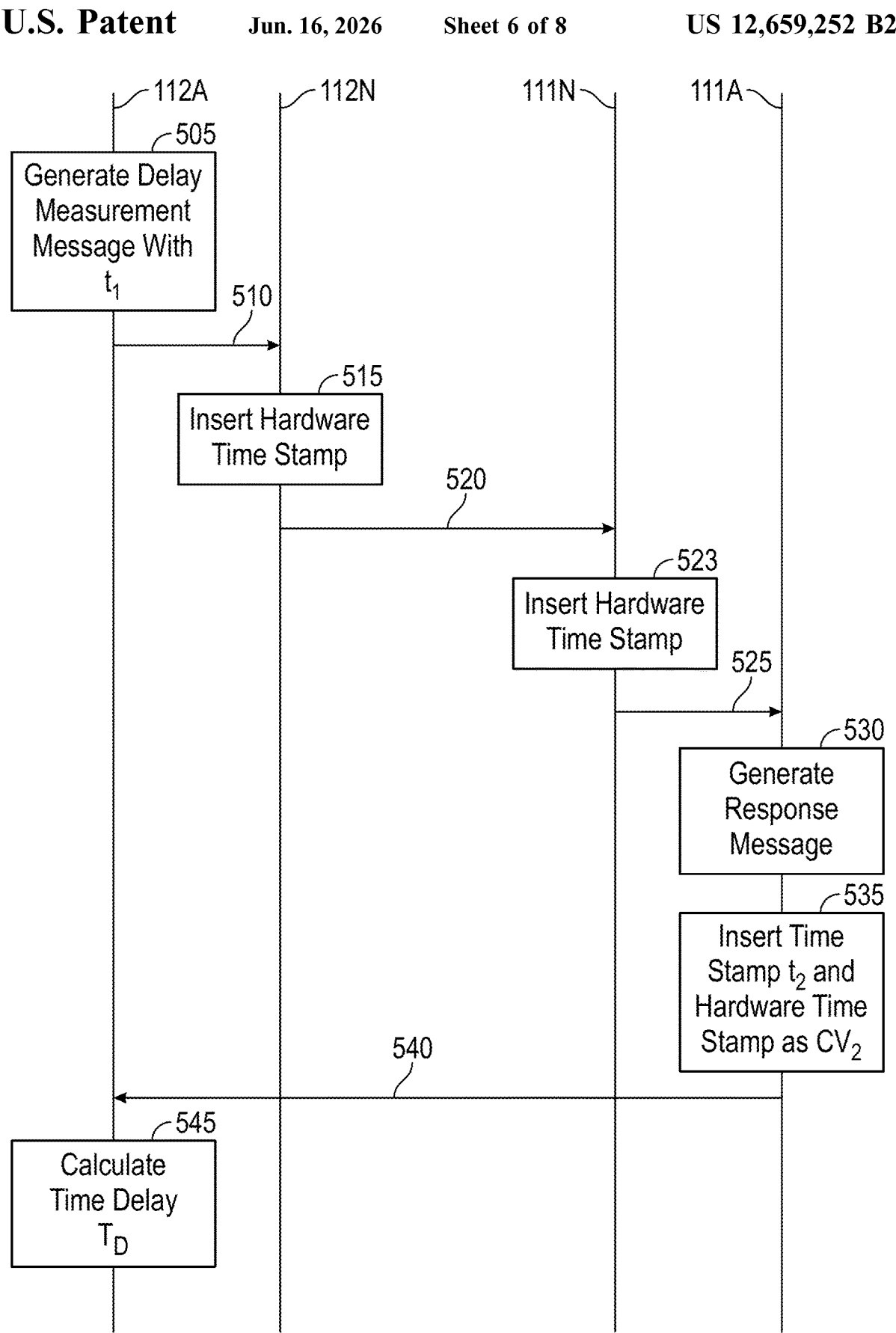
FIG. 5 is a block diagram describing one-way delay measurement in accordance with certain embodiments of the disclosure.
Figure 6:
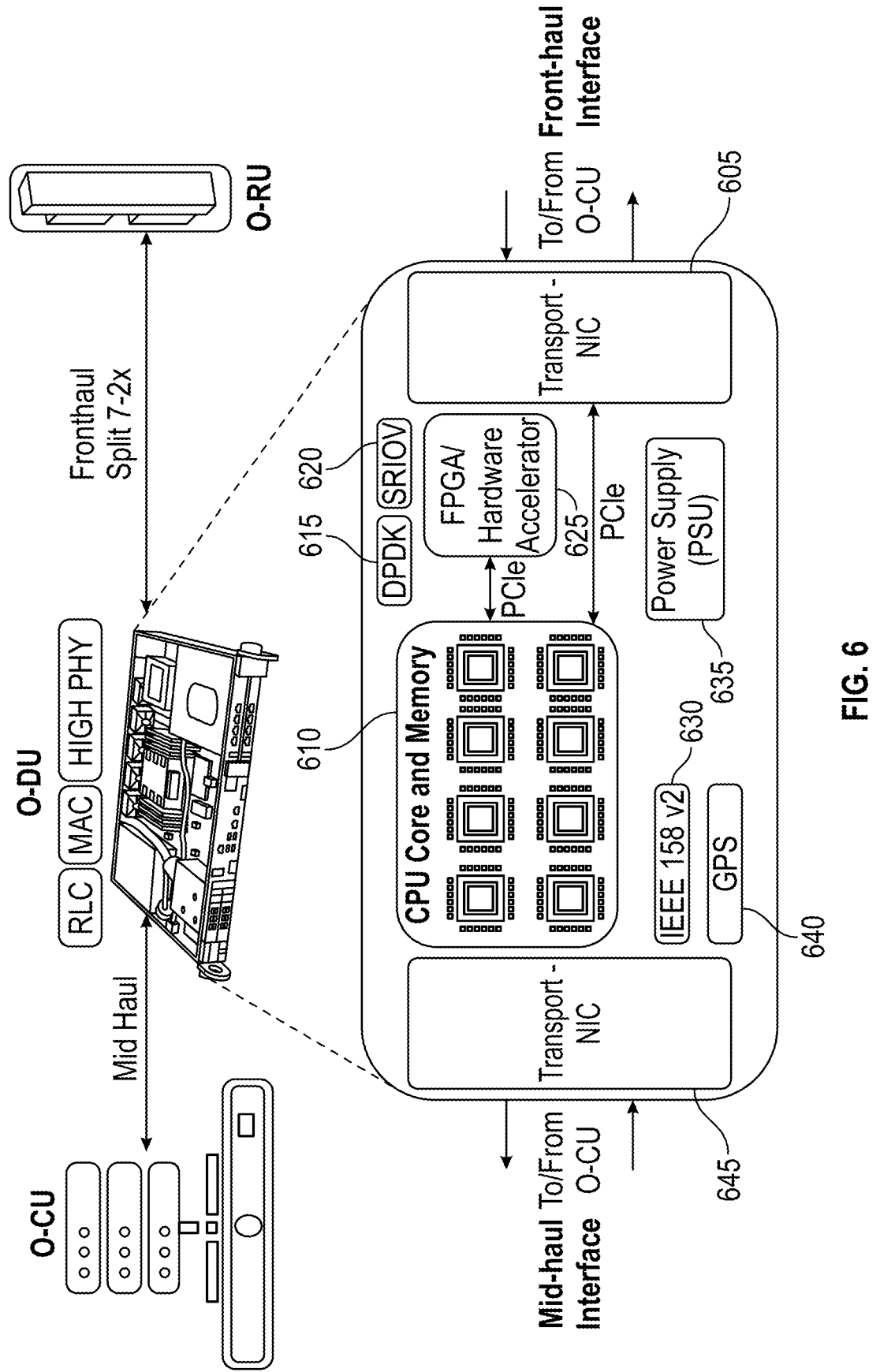
FIG. 6 is a block diagram of an Open Radio Access Network (O-RAN) Distributed Unit (O-DU) in accordance with certain embodiments of the disclosure.
Figure 7:
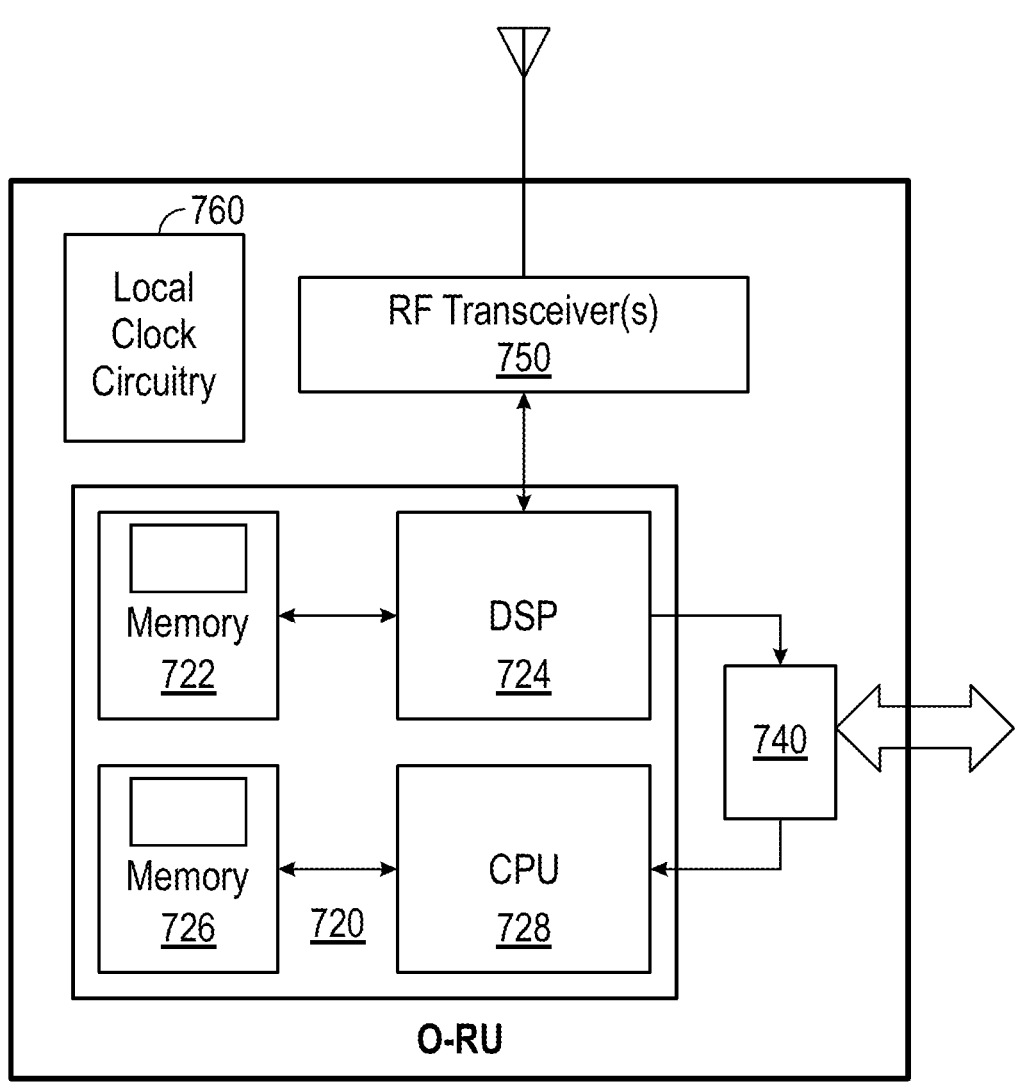
FIG. 7 is a block diagram of an O-RAN Radio Unit (O-RU) in accordance with certain embodiments of the disclosure.

The nodes (RU/O-RU and DU/O-DU) of the fronthaul network may operate with very tight transmission and reception windows. Accordingly, it may be important to routinely measure the network delay. FIGS. 3A and 3B disclose a delay measurement procedure. The delay measurement procedure uses compensation values that account for the delays between initiation of the delay measurement and the actual transmission of a one-way delay measurement message, and actual reception of the one-way delay measurement message and detection of the reception. FIG. 4 shows a packet used to communicate various times, including the compensation values. In FIG. 5, the compensation values are based on hardware time stamps that indicate the time that the one-way delay measurement message is transmitted and received on the fronthaul network. FIGS. 6 and 7 describe an O-DU and O-RU that are configured to perform the operations described herein.

As the disclosure allows for various changes and numerous examples, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of embodiments are merely identifier codes for distinguishing one element from another.

Also, in the present disclosure, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Throughout the disclosure, the expression "at least one of a, b or c" indicates only a, only b, only c, both a and b, both a and c, both b and c, all of a, b, and c, or variations thereof.

Embodiments of the disclosure will now be sequentially described more fully with reference to the accompanying drawings.

FIG. 1A is a block diagram of a communication system 100 where certain embodiments of the disclosure may be practiced. The communication system 100 includes user equipment (UE) 105, a radio access network (RAN) 110 of base stations 110', and a core network 115.

The UE 105 may take on a variety of forms, such as a smartphone, a personal computer (PC), a user device, a smartwatch, a laptop computer, a tablet computer, a personal digital assistant (PDA), a server, a CD/DVD player, an MP3 player, a Global Positioning System (GPS) device, a video player, a gaming console, a handheld communications device, a workstation, a router, an access point, and any combination thereof. In certain embodiments, the UE 105 can comprise an Internet of Things (IoT) device. Moreover, in certain embodiments, the UE 105 may include, for example, a display, power source, a speaker, microphone, memory, buffers, and a radio. Furthermore, the UE 105 may be capable of communication with a wireless network, such as a 3G, 4G, or 5G NR network.

The UE 105 engages in radio transmission with a base station 110' of a RAN 110. A base station 110' may include, but is not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through a radio interface to the network.

A base station 110' may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the disclosure should not be limited to the above mentioned protocols.

The base station 110' is operable to provide radio coverage to a specific geographical area using a plurality of cells forming the RAN 110. The base station 110' supports the operations of the cells. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station 110' can communicate with one or more UEs in the radio communication system through the plurality of cells.

The core network 115 can be connected to the Internet, provider networks, the landline network, and other networks. The foregoing networks, in turn can facilitate communication with other UE, servers, and landline phones.

Referring to FIG. 1B, the base stations 110 of the RAN 110' can include radio units (RU) 111, and distributed units (DU) 112. The RUs 111 can include the front end of a base station that is co-located with the antenna. The RUs 111 receive uplink signals from, and transmit downlink signals to, the UEs 105. The RUs 111 can include the transceivers where the radio frequency signals are transmitted, received, modulated, demodulated, amplified, and digitized. The RUs 111 can host the PHY-Low layer.

The DUs 112 perform real-time baseband processing functions and can be centralized or located near the cell site. The DUs 112 work with the lowest layers of the protocol stack, such as the Radio Link Control (RLC), Medium Access Control (MAC), and the Physical (PHY) layers. The DUs 112 consolidate and process inbound traffic from, or process, break out, and distribute traffic to, multiple RUs 111. The DUs 112 are connected to the core network 115 via a central unit (not shown).

The communication network between the RUs 111 and the DUs 112 is referred to as the fronthaul (FH) network, while communication network between the DUs 112 and the core network 115 is referred to as the backhaul network.

In certain embodiments, the RAN 110 can comprise an Open RAN (O-RAN) in accordance with the O-RAN alliance. The O-RAN Alliance was established with the aim of promoting the openness and improving intelligence of wireless access networks (RAN) in the 5G era. Accordingly, the RU 111 can comprise an O-RU 111 and the DU 112 can comprise an O-DU 112. In O-RAN, since the function sharing points of the O-RU 111 and the O-DU 112 are placed in the physical (PHY) layer, strict timing accuracy is desirable. For this reason, FH delay management is performed, and a transmission window and a reception window are used. Hereinafter, embodiments using O-RAN will be described with the understanding that the disclosure is not limited to O-RAN.

Figure 2:
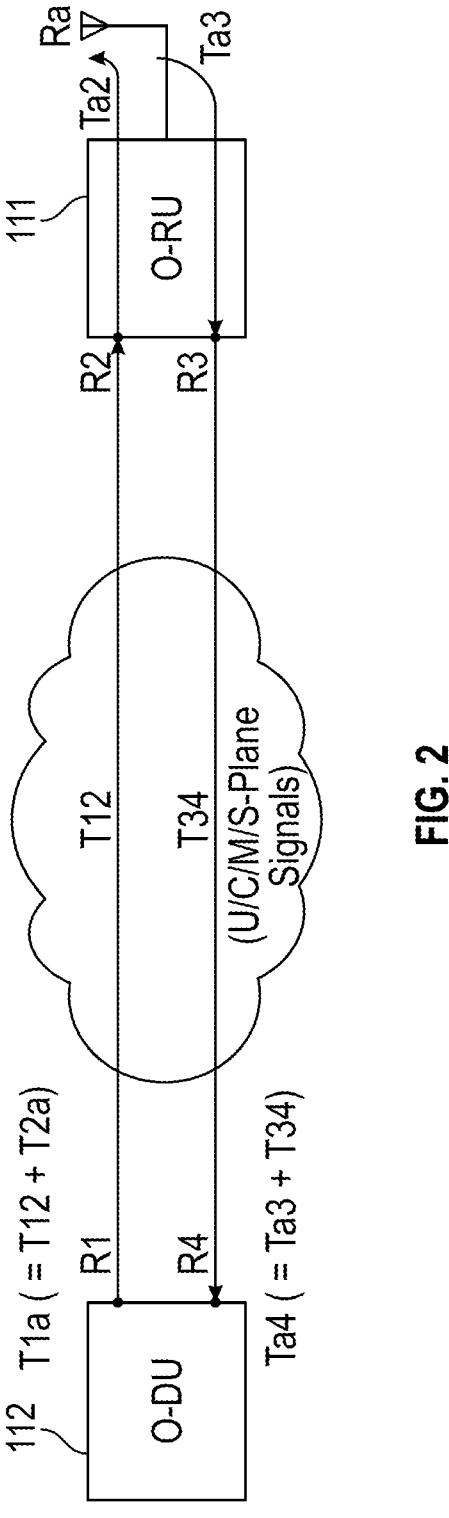
FIG. 2 is a block diagram of a fronthaul network in accordance with certain embodiments of the disclosure.

Referring now to FIG. 2, there is a block diagram of reference points for delay management in an O-RAN FH network 200 in accordance with certain embodiments of the disclosure. The FH network 200 includes an O-DU 112 and an O-RU 111 communicating over a FH network 200. The FH network 200 can have any number of intermediate nodes, and switches, and a transmission from the O-DU 112 to the O-RU111, and vice versa, can include any number of hops. In the O-RAN FH network 200, it is desirable to keep transport delays (uplink and downlink delays) within specified upper and lower bounds to honor receive windows of the O-DU 112 and the O-RU 111.

It shall be understood that the disclosure is not limited to the O-RAN FH interface 200. For example, certain embodiments may use from a variety of other nodes besides the O-RU 111 and O-DU 112, including, but not limited to, an Enhanced Common Pubic Radio Interface (eCPRI) radio equipment (eRE), or an eCPRI radio equipment control (eREC). Moreover, certain embodiments may use a different network from a FH network 200. Moreover, embodiments are described where the FH network 200 includes a fiber optic network, with the understanding that the disclosure is not limited to a fiber optic network.

On the downlink, the point R1 represents a port where the O-DU 112 places a packet on the optical fiber. Point R2 represents a port where the O-RU 111 receives the packet from the optical fiber. Point Ra represents an antenna of the O-RU 111 that transmits the packet over the air to the UE 105. On the uplink, Point R3 represents a port where the O-RU 111 places a packet on the optical fiber, and point R4 represents a port where the O-DU 112 receives the packet from the optical fiber. On the downlink, time T12 is the time delay caused by the optical fiber when the packet is transmitted from R1 of O-DU 112 to R2 of O-RU 111. On the uplink, time T34 is the time delay caused by the optical fiber when the packet is transmitted from R3 of the O-RU 111 to R4 of the O-DU 112.

The Common Public Radio Interface: eCPRI Interface Specification V2.0, (now referred to as the "eCPRI Standard"), which is incorporated herein in its entirety for all purposes, defines delay model latency parameters, T1*a*, T2*a*, Ta3, and Ta4. On the downlink, parameter T1*a* measures the total time delay between transmission of the packet from R1 of the O-DU 112 to transmission by the antenna of the O-RU 111 (point Ra) over the air. Parameter T2*a* measures the time delay between reception of the packet at the O-RU 111 (point R2) and transmission of the packet by the antenna (point Ra) over the air. On the uplink, parameter Ta4 measures the total time delay between reception of a packet from the antenna (point Ra) of the O-RU 111 to reception of the packet at R1 of the O-DU 112. Parameter Ta3 measures the time delay between reception of the packet from the antenna (point Ra) of the O-RU 111 to transmission of the packet at point R3 of the O-RU 111. The eCPRI Standard defines minimum and maximum windows for the delay model latency parameters, T1*a*, T2*a*, Ta3, and Ta4, e.g., T1*a*min, T1*a*max, T2*a*min, T2*a*max, Ta3min, Ta3max, Ta4min, and Ta4max.

To ensure compliance with the minimum and maximum windows for the delay model latency parameters, one of the O-RU 111 and the O-DU 112 (the sender) can send a one-way delay measurement message to measure the time delay between the sender and the other one of the O-RU 111 and the O-DU 112 (the receiver).

FIG. 3A is a block diagram describing one-way delay measurement on the downlink in accordance with certain embodiments of the disclosure. It is once again noted that although the O-RU 111 and the O-DU 112 are depicted, the disclosure is not limited to the foregoing and other nodes can be used. At time $t_1$, the O-DU 112 initiates measurement of T12 by generating a one-way delay measurement message 305. The message can comprise a packet that will be described in more detail in FIG. 4.

There is a time difference between generation and transmission of the message 305 at an application layer, and actual placement of the packet on the optical fiber (point R1) of the FH Network 200. For example, if the O-DU is virtualized, the delay is introduced by the virtualization layer, network interface card (NIC) processing time, and the Single Root Input/Output Virtualization (SRIOV) function of the NIC. After a delay of $t_{CV1}$, that is time=$t_1$+$t_{CV1}$, the message 305 is transmitted by the FH Network 200 to the O-RU 111. The message 305 can include the time stamp $t_1$ as well a compensation value to compensate for $t_{CV1}$.

After a time $t_D$ elapses, that is, time=$t_1$+$t_{CV1}$+$t_D$, the O-RU 111 receives the message 305. However, there is another delay, $t_{CV2}$, at the O-RU 111 between arrival of the message 305 and detection of the message 305 at the application layer at time $t_2$. At time $t_2$, the O-RU 111 places a time stamp $t_2$ in the message. The O-RU 111 then creates a response message 310 which contains the receive time stamp $t_2$ and a compensation value to compensate for $t_{CV1}$. The O-RU 111 transmits the response message to the O-DU 112. When the O-DU 112 receives the response message 310, the O-DU 112 can calculate $t_D$ from $t_D$=($t_2$−$t_{CV2}$)−($t_1$+$t_{CV1}$).

FIG. 3B is a block diagram describing one-way delay measurement on the uplink in accordance with certain embodiments of the disclosure. The O-DU 112 transmits a one-way delay measurement message with a remote request 315. At time $t_1$, the O-RU 111 initiates measurement of T34 by generating a one-way delay measurement message 320. The message can comprise a packet that will be described in more detail in FIG. 4.

There is a time difference between generation and transmission of the message 320 at an application layer, and actual placement of the packet on the optical fiber (point R3) of the FH Network 200. For example, if the O-RU is virtualized, the delay is introduced by the virtualization layer, and network interface card (NIC) processing time, and the Single Root Input/Output Virtualization (SRIOV) function of the NIC. After a delay of $t_{CV1}$, that is time=$t_1$+$t_{CV1}$, the message 320 is transmitted by the FH Network 200 to the O-RU 111. The message 320 can include the time stamp $t_1$ as well a compensation value to compensate for $t_{CV1}$.

After a time to elapses, that is, time=$t_1$+$t_{CV1}$+$t_D$, the O-RU 111 receives the message 320. However, there is another delay, $t_{CV2}$, at the O-RU 111 between arrival of the message 320 and detection of the message at the application layer at time $t_2$. At time $t_2$, the O-RU 111 places a time stamp $t_2$ in the message. The O-RU 111 then creates a response message 325 which contains the receive time stamp $t_2$ and a compensation value to compensate for $t_{CV1}$. The O-RU 111 transmits the response message 325 to the O-DU 112. When the O-DU 112 receives the response message 325, the O-DU 112 can calculate $t_D$ from $t_D$=($t_2$-$t_{CV2}$)-($t_1$+$t_{CV1}$).

FIG. 4 is a block diagram of a one-way delay measurement message in accordance with an embodiment of the disclosure. The one-way delay measurement message can comprise 20 bytes as well as L dummy bytes. Byte 0 can indicate the measurement identification (ID) to distinguish between other instances of measurements. Messages associated with one one-way delay measurement can use the same measurement ID. For example, messages 305 and 310 of FIG. 3A can each carry the same measurement ID to indicate that messages 305 and 310 are messages related to the same instance of one-way delay measurement. Messages 315, 320 and 325 can carry the same measurement ID to indicate that messages 315, 320, and 325 are related to the same instance of one-way delay measurement.

Byte 1 can indicate whether the message is a request, a response, or remote request. For example, byte 1 of message 315 may have an identifier indicating that the message is a remote request. Byte 1 of messages 305 and 320 may include an identifier indicating that the message is a one-way delay measurement message. Byte 1 of messages 310 and 325 may include an identifier indicating that the message is a response to a one-way delay measurement message.

Bytes 2-11 can be used to store time stamps. For example, messages 305 and 320 can include a value indicating $t_1$ in bytes 2-11. Messages 310 and 325 can include a value indicating $t_2$ in bytes 2-11.

Bytes 12-19 can be used to store the compensation value for $t_{CV1}$ or $t_{CV2}$. For example, bytes 12-19 in messages 305 and 320 can include a compensation value for $t_{CV1}$. Bytes 12-19 in messages 310 and 325 can include a compensation value for $t_{CV2}$.

It is noted that an empirically determined estimated value can be used for $t_{CV1}$ and $t_{CV2}$. For example, the empirically determined estimated value can be determined by taking an average over a large testing sample. However, using an estimate is subject to errors, and does result in a real time, deterministic measurement of the FH delay. Moreover, an instantaneous spike in the actual $t_{CV1}$ and $t_{CV2}$, cannot be accounted for, because $t_{CV1}$ and $t_{CV2}$ would remain constant.

Accordingly, in certain embodiments of the disclosure, the values indicating $t_{CV1}$ and $t_{CV2}$ can be determined based on hardware time stamps that are inserted immediately when the one-way delay measurement message is transmitted on the FH Network 200 and received from the FH Network 200, e.g., at points R1, R2, R3, and R4.

For example, at the O-DU 112, a one-way delay measurement message gets time stamped at an L1 layer, e.g., $t_1$ in FIG. 3A. Additionally, the one-way delay measurement message also gets time stamped (HW Time Stamp$_1$) by the hardware, immediately before the packet is placed on the FH Network 200, e.g., at point R1. Accordingly, $t_{CV1}$ can be calculated as follows:

$$t_{CV1}=HW\text{ Time Stamp}_1-t_1$$

The foregoing more accurately represents the time period between initiating measurement of T12, and transmission of the one-way delay measurement message 305.

At the O-RU 111, the one-way delay measurement message received from the O-DU 112 gets another hardware time stamp immediately upon reception, e.g., at point R2, as well as the time stamp $t_2$. Accordingly, $t_{CV2}$ can be calculated as follows:

$$t_{CV2}=t_2-HW\text{ Time Stamp}_2$$

The foregoing more accurately represents the time period between receipt of the one-way delay measurement message 305 and detection of receipt of the one-way delay measurement message 305.

Accordingly, T12, time delay $t_d$, continues to be measured by the following equation:

$$t_D=(t_2-t_{CV2})-(t_1+t_{CV1})$$

The measurement is deterministic and in real time, and uses dynamic values for $t_{CV1}$ and $t_{CV2}$. For example, instantaneous changes in respective delays at the O-DU 112 and the O-RU 111 would result in changes in the values for $t_{CV1}$ and $t_{CV2}$.

T1$a$ can be measured as follows:

$$T1a=t_2-t_1+t_{CV1}+t_{CV2}$$

On the uplink side (FIG. 3B), at the O-RU 111, the one-way delay measurement message 320 gets time stamped at the time that measurement of T21 is initiated, $t_1$ (to avoid confusion, $T_{31}$ is used). The one-way delay measurement message 320 also gets time stamped ($T_{32}$) by the hardware immediately before placement on the FH Network 200. Accordingly, a new parameter $T_{3\text{-}internal\text{-}dalay}$ represents the internal delay at the O-RU 111. The parameter $T_{3\text{-}internal\text{-}dalay}$ is calculated as follows:

$$T_{3\text{-}internal\text{-}dalay}=T_{32}-T_{31}$$

The one-way delay measurement message 320 can be updated with $T_{3\text{-}internal\text{-}dalay}$ and $T_{32}$. For example, the one-way delay measurement message 320 can include $T_{3\text{-}internal\text{-}dalay}$ as the compensation value. The hardware time stamp $T_{32}$ can be placed into field $T_{32\text{-}network\text{-}delay}$.

When the O-DU 112 receives the one-way delay measurement message 320, the one-way delay measurement message 320 gets time stamped by the hardware ($T_{41}$) and time stamped at the L1 layer, e.g., $T_{42}$.

Accordingly, a parameter $T_{4\text{-}internal\text{-}delay}$ indicates an internal delay at O-DU 112.

Parameter $T_{4\text{-}internal\text{-}delay}$ is calculated as:

$$T_{4\text{-}internal\text{-}delay}=T_{42}-T_{41}$$

The network delay, $T_{34\text{-}network\text{-}delay}=T_{41}$

The effective Ta4 parameter can be calculated as:

$$Ta4\text{delay}=Ta3+T_{34\text{-}network\text{-}delay}+T_{4\text{-}internal\text{-}delay}$$

Referring to FIG. 5, there is illustrated a signal flow diagram describing one way delay measurement in accordance with certain aspects of the disclosure. At 505, at an application level of the O-DU 112A, the O-DU 112 generates a one-way delay measurement message comprising a packet and inserts a time stamp, $t_1$, into an application layer of the packet. At 510, the message comprising the packet is sent for transmission via a NIC 112N at the O-DU (O-DU NIC). At 515, the O-DU NIC 112N inserts a hardware time stamp, HW Time Stamp$_1$, into the transport layer of the packet. In certain embodiments, the O-DU NIC 112N can insert and/or replace a compensation value $t_{CV1}$ in the application layer of the packet, wherein, $t_{CV1}$=HW Time Stamp$_1$−$t_1$.

Immediately after inserting the hardware time stamp, at 520, the O-DU transmits the one-way delay measurement request to the O-RU 111. In this instance, it shall be understood that "immediately" is subsequent within a period of time such that the HW Time Stamp$_1$ substantially reflects the time that the O-DU transmits the one-way delay measurement request. When the one-way delay measurement request is received by a NIC at the O-RU 111N, the O-RU NIC 111N immediately inserts a hardware time stamp HW Time Stamp$_2$ into the transport layer of the packet of the one-way delay measurement request at 523. In this instance, it shall be understood that "immediately" is subsequent within a period of time such that the HW Time Stamp$_2$ substantially reflects the time that the O-RU NIC 111N receives the one-way delay measurement request.

At 525, the one-way delay measurement request is received at the application level of the O-RU 111A. At 530, the O-RU 111A generates a response message comprising another packet. At 535, the O-RU 111A inserts a time stamp $t_2$ and a compensation value $t_{CV2}$ into the application layer of the another packet. The compensation value $t_{CV2}$=$t_2$−HW Time Stamp$_2$. At 540, the O-RU transmits the response to the O-DU.

At 545, the O-DU determines the time delay $t_d$, wherein $t_d$=$t_D$=$(t_2-t_{CV2})$−$(t_1+t_{CV1})$.

FIG. 6 is a block diagram of an O-DU 112 in accordance with certain embodiments of the disclosure. The O-DU 112 can function as a baseband processing unit to handle a high PHY layer, and the MAC and RLC layers with network function virtualization (NFV).

The O-DU 112 includes a transport NIC 605, CPU core and memory 610, a data plane development kit (DPDK) 615, a Single Root Input/Output Virtualization (SRIOV) 620, a Field Programmable Gate Array (FPGA)/Hardware Accelerator 625, an IEEE 1588 Precision Time Protocol (PTP) module 630, power supply 635, a Global Positioning Satellite (GPS) 640, and a second transport NIC 645.

The CPU core and memory 610 can include one or more processors and store executable instructions that, when executed, cause the one or more processors to perform any of the actions described herein.

The transport NIC 605 transmits and receives packets from the FH network 200. Additionally, the transport NIC 605 inserts a hardware time stamp into packets that are received or transmitted on the FH Network 200.

FIG. 7 is a block diagram describing an O-RU 111 in accordance with certain embodiments of the disclosure. The O-RU 111 can be an electronic device that includes a processing subsystem 720 that includes at least one processor 724, 728, and at least one memory 722, 726 coupled to the at least one processor 724, 728. The at least one memory 722, 726 stores instructions executable by the at least one processor 724, 728 to perform functions of the O-RU 111. The O-RU 111 also includes local clock circuitry 760 and radio-frequency transceivers 750 to communicate with user equipment 105 via an antenna. The radio frequency transceivers 750 may include one or more transmitters and one or more receivers which are independently controllable. In certain embodiments, one of the processors 724 can comprise a digital signal processor 724 that receives signals from the RF transceiver 750. A fronthaul link interface 740 couples the O-RU 111 to the FH network 200. In certain embodiments, the fronthaul link interface 740 can include a NIC.

In certain embodiments, the fronthaul link interface 740 through the NIC inserts a hardware time stamp in packets that are transmitted on the FH network 200. For example, the NIC can selectively insert the hardware time stamps in a transport layer of one-way delay measurement messages. Additionally, in certain embodiments, the fronthaul interface 740 through the NIC can update the compensation value field with a value that is the difference between the hardware time stamp and the time $t_1$.

It will be appreciated that in certain embodiments, uplink and downlink delays may be split and calculated at several layers, but not as a whole. The foregoing gives a deterministic way to isolate a module or layer that is causing excessive delays and remediating the FH network 200 in more efficient way. Moreover, since existing FH networks are commonly equipped with hardware time stamping capabilities for PTP, it is convenient to extend existing IEEE 1588 time stamping in the NICs for one-way delay measurement messages.

According to certain embodiments, an Open Radio Access Network (O-RAN) 110 comprises: an O-RAN Radio Unit (O-RU) 111 configured to transmit radio signals to user equipment; an O-RAN Distributed Unit (O-DU) 112 configured to perform baseband processing; and a fronthaul network 200, wherein the O-RU and the O-DU are nodes of the fronthaul network, and wherein the O-RU and the O-DU are configured to communicate over the fronthaul network; wherein the O-DU is configured to transmit a one-way delay measurement message 305 to the O-RU on the fronthaul network, wherein the one-way delay measurement message includes a value that is based on a hardware time stamp (HW Time Stamp$_1$) that was inserted immediately prior to transmission of the one-way delay measurement message; and wherein the O-RU is configured to transmit a response (310) to the one-way delay measurement message to the O-DU, wherein the response includes a second value that is based on a second hardware time stamp (HW Time Stamp$_2$) generated when the O-RU received the one-way delay measurement message from the fronthaul network.

According to certain embodiments, the one-way delay measurement message comprises a packet (FIG. 4), the packet comprising a compensation value field, and wherein the compensation value field stores the value.

According to certain embodiments, the response comprises a second packet (FIG. 4), the second packet comprising a second compensation value field, and wherein the second compensation value field stores the second value.

According to certain embodiments, the O-DU determines a delay, based at least in part on the value in the compensation value field of the packet and the second value in the second compensation value field of the second packet (FIG. 5, 545).

According to certain embodiments, the O-DU comprises a Network Interface Card (NIC) 605 interfacing the O-DU with the fronthaul network, and wherein the NIC generates the hardware time stamp (515), and wherein the O-RU comprises a second NIC 740 interfacing the O-RU with the fronthaul network, and wherein the second NIC generates the second hardware time stamp (523).

According to certain embodiments, a method for one-way delay measurement, comprises: generating a one-way delay measurement message comprising a packet at an Open Radio Access Network (O-RAN) Distributed Unit (O-DU) (505); inserting a time stamp in an application layer of the packet (505); inserting a hardware time stamp in a transport layer of the packet (515); transmitting the one-way delay measurement message immediately after inserting the hardware time stamp, from the O-DU to an O-RAN Radio Unit (O-RU) over a fronthaul network (520); inserting a second hardware time stamp in the packet immediately after receiving the one-way delay measurement message by the O-RU (523); generating a response message to the one-way delay measurement message by the O-RU, wherein the response message comprises a second packet (530); inserting a second time stamp and a value into the second packet by the O-RU, wherein the value is a difference between the second time stamp and the second hardware time stamp (535); and transmitting the response message from the O-RU to the O-DU over the fronthaul network (540).

According to certain embodiments, the method further comprises: determining a delay, based at least in part on the time stamp, the hardware time stamp, the second time stamp, and the compensation value (545).

According to certain embodiments, the method further comprises inserting a second value in the packet by the O-DU, wherein the second value is the difference between the hardware time stamp and the time stamp.

According to certain embodiments, inserting the hardware time stamp comprises inserting the hardware time stamp by a Network Interface Card (NIC) that interfaces the O-DU with the fronthaul network (112N); and inserting the second hardware time stamp comprises inserting the second hardware time stamp by a second NIC that interfaces the O-RU with the fronthaul network (111*n*).

According to certain embodiments, a communication system 100 comprising: a node 112, configured to: generate a message (505) comprising a packet (FIG. 4); insert a time stamp t₁ in an application layer of the packet (505); insert a hardware time stamp HW Time Stamp₁ in a transport layer of the packet (515); and transmit (520) the message immediately after inserting the hardware time stamp, over a network 200 to a second node 111; and the second node, wherein the second node is configured to: receive the message from the node over the network; insert a second hardware time stamp in the transport layer of the packet, immediately after receiving the message (523); generate a response, wherein the response comprises a second packet (FIG. 4) (530); insert a second time stamp t₂ and a value in the second packet t_{CV2}, wherein the value is a difference between the second time stamp and the second hardware time stamp (535); and transmit the response to the node over the network (540).

According to certain embodiments, the node is further configured to: insert a second value t_{CV1} in a compensation value field in the application layer of the packet (FIG. 4), and wherein the second value is a difference between the hardware time stamp and the time stamp.

According to certain embodiments, the node comprises an Open Radio Access Network (O-RAN) Distributed Unit (O-DU) 112.

According to certain embodiments, the second node comprises an O-RAN Radio Unit (O-RU) 111.

In certain embodiments, the network comprises a fronthaul network 200.

According to certain embodiments, the second node is configured to: insert the value in a compensation value field of the second packet.

According to certain embodiments, the second node inserts the second time stamp in an application layer of the second packet and the value in the compensation value field in the application layer of the second packet.

According to certain embodiments, the node is further configured to: receive the response from the second node over the network (540), and determine a delay based at least in part on the second time stamp, the value in the compensation value field of the second packet, the hardware time stamp, and the time stamp (545).

According to certain embodiments, the node comprises a Network Interface Card (NIC) 605 configured to generate the hardware time stamp.

According to certain embodiments, the second node comprises a second NIC 740 configured to generate the second hardware time stamp.

According to certain embodiments, the message comprises a one-way delay measurement message.

The above-described embodiments may be stored as a program in a machine-readable storage medium. The machine-readable storage medium may be provided as a non-transitory storage medium. Here, the 'non-transitory storage medium' is a tangible device and means that the storage medium does not include a signal (for example, electromagnetic waves), but this term does not distinguish whether data is stored semi-permanently or temporarily in the storage medium. For example, the 'non-transitory storage medium' may include a buffer that temporarily stores data.

According to an embodiment, methods according to the various disclosed embodiments of the disclosure may be provided by being included in a computer program product. The computer program product may be traded as a commodity between a seller and a purchaser. The computer program product may be distributed in the form of a machine-readable storage medium (e.g., compact disc read only memory (CD-ROM)), or be distributed online (e.g., download or upload) via an application store (e.g., Play Store™) or directly between two user devices (e.g., smartphones). When distributed online, at least part of the computer program product (e.g., a downloadable app) may be temporarily generated or at least temporarily stored in a machine-readable storage medium, such as a memory of a manufacturer's server, a server of the application store, or a relay server.

While one or more embodiments of the disclosure have been described with reference to the figures, it will be understood by those of ordinary skill in the art that various changes in form and details may be made therein without departing from the spirit and scope as defined by the following claims.

What is claimed is:
1. An Open Radio Access Network (O-RAN) comprising:
an O-RAN Distributed Unit (O-DU) configured to perform baseband processing,
wherein the O-DU is configured to transmit a one-way delay measurement message to an O-RAN Radio Unit (O-RU) on a fronthaul network, wherein the one-way delay measurement message includes a value that is based on a hardware time stamp that was inserted immediately prior to transmission of the one-way delay measurement message; and
wherein the O-DU is configured to receive a response to the one-way delay measurement message from the O-RU, wherein the response includes a second value that is based on a second hardware time stamp generated when the O-RU received the one-way delay measurement message from the fronthaul network.
2. The O-RAN of claim 1, wherein the one-way delay measurement message comprises a packet, the packet com- prising a compensation value field, and wherein the compensation value field stores the value.

3. The O-RAN of claim 2, wherein the response comprises a second packet, the second packet comprising a second compensation value field, and wherein the second compensation value field stores the second value.

4. The O-RAN of claim 3, wherein the O-DU determines a delay, based at least in part on the value in the compensation value field of the packet and the second value in the second compensation value field of the second packet.

5. The O-RAN of claim 1, wherein the O-DU comprises a Network Interface Card (NIC) interfacing the O-DU with the fronthaul network, and wherein the NIC generates the hardware time stamp, and wherein the second hardware time stamp is generated by a second NIC of the O-RU interfacing the O-RU with the fronthaul network.

6. A method for one-way delay measurement, the method comprising:

generating a one-way delay measurement message comprising a packet at an Open Radio Access Network (O-RAN) Distributed Unit (O-DU);

inserting a time stamp in an application layer of the packet;

inserting a hardware time stamp in a transport layer of the packet;

transmitting the one-way delay measurement message immediately after inserting the hardware time stamp, from the O-DU to an O-RAN Radio Unit (O-RU) over a fronthaul network;

receiving, by the O-DU from the O-RU, a response message to the one-way delay measurement message, wherein the response message comprises a second packet in which a second time stamp and a value are inserted by the O-RU, wherein the value is a difference between the second time stamp and a second hardware time stamp generated when the O-RU received the one-way delay measurement message from the fronthaul network.

7. The method of claim 6, further comprising:

determining a delay, based at least in part on the time stamp, the hardware time stamp, the second time stamp, and the value.

8. The method of claim 6, further comprising:

inserting a second value in the packet by the O-DU, wherein the second value is the difference between the hardware time stamp and the time stamp.

9. The method of claim 6, wherein:

inserting the hardware time stamp comprises inserting the hardware time stamp by a Network Interface Card (NIC) that interfaces the O-DU with the fronthaul network; and the second hardware time stamp is generated by a second NIC of the O-RU that interfaces the O-RU with the fronthaul network.

10. A communication system comprising:

a node, configured to:

generate a message comprising a packet;

insert a time stamp in an application layer of the packet;

insert a hardware time stamp in a transport layer of the packet; and transmit the message immediately after inserting the hardware time stamp, over a network to a second node; and the second node, wherein the second node is configured to:

receive the message from the node over the network;

insert a second hardware time stamp in the transport layer of the packet, immediately after receiving the message;

generate a response, wherein the response comprises a second packet;

insert a second time stamp and a value in the second packet, wherein the value is a difference between the second time stamp and the second hardware time stamp; and transmit the response to the node over the network.

11. The communication system of claim 10, wherein the node is further configured to:

insert a second value in a compensation value field in the application layer of the packet, and wherein the second value is a difference between the hardware time stamp and the time stamp.

12. The communication system of claim 10, wherein the node comprises an Open Radio Access Network (O-RAN) Distributed Unit (O-DU).

13. The communication system of claim 12, wherein the second node comprises an O-RAN Radio Unit (O-RU).

14. The communication system of claim 13, wherein the network comprises a fronthaul network.

15. The communication system of claim 10, wherein the second node is configured to:

insert the value in a compensation value field of the second packet.

16. The communication system of claim 15, wherein the second node inserts the second time stamp in an application layer of the second packet and the value in the compensation value field in the application layer of the second packet.

17. The communication system of claim 16, wherein the node is further configured to:

receive the response from the second node over the network, and determine a delay based at least in part on the second time stamp, the value in the compensation value field of the second packet, the hardware time stamp, and the time stamp.

18. The communication system of claim 10, wherein the node comprises a Network Interface Card (NIC) configured to generate the hardware time stamp.

19. The communication system of claim 18, wherein the second node comprises a second NIC configured to generate the second hardware time stamp.

20. The communication system of claim 10, wherein the message comprises a one-way delay measurement message.

* * * * *